(12) United States Patent
Guan et al.

(10) Patent No.: US 12,271,243 B2
(45) Date of Patent: Apr. 8, 2025

(54) POWER CONSUMPTION MANAGEMENT METHOD AND APPARATUS

(71) Applicant: HUAWEI TECHNOLOGIES CO., LTD., Shenzhen (CN)

(72) Inventors: Yanjie Guan, Shenzhen (CN); Yilong Wu, Shenzhen (CN); Kaitian Du, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 60 days.

(21) Appl. No.: 18/304,100

(22) Filed: Apr. 20, 2023

(65) Prior Publication Data

US 2023/0259186 A1    Aug. 17, 2023

Related U.S. Application Data

(63) Continuation of application No. PCT/CN2021/123128, filed on Oct. 11, 2021.

(30) Foreign Application Priority Data

Oct. 20, 2020 (CN) .................... 202011124130.8
Jan. 22, 2021 (CN) .................... 202110089298.8

(51) Int. Cl.
    *G06F 1/26* (2006.01)
(52) U.S. Cl.
    CPC ...................... *G06F 1/26* (2013.01)
(58) Field of Classification Search
    CPC ............................................. G06F 1/26

USPC ............................................................ 713/300
See application file for complete search history.

(56) References Cited

U.S. PATENT DOCUMENTS

| | | | | | |
|---|---|---|---|---|---|
| 5,357,632 | A | * | 10/1994 | Pian .................... | G06F 9/505 709/201 |
| 5,546,590 | A | * | 8/1996 | Pierce .................. | G06F 1/3203 713/323 |
| 5,666,540 | A | * | 9/1997 | Hagiwara ............. | G06F 9/4418 713/323 |
| 6,694,453 | B1 | * | 2/2004 | Shukla .................. | G06F 1/30 714/24 |
| 7,035,155 | B2 | * | 4/2006 | Stimak ............... | G11C 11/40611 365/233.17 |
| 7,581,131 | B1 | * | 8/2009 | Prasad .................. | G06F 1/12 713/400 |

(Continued)

FOREIGN PATENT DOCUMENTS

| CN | 109062668 A | 12/2018 |
|---|---|---|
| CN | 109766190 A | 5/2019 |

*Primary Examiner* — Paul R. Myers
(74) *Attorney, Agent, or Firm* — Leydig, Voit & Mayer, Ltd.

(57) ABSTRACT

A power consumption management method. Resources such as computing resources or communication resources in the computer system include a first resource area and a second resource area. In addition, a resource provided in the first resource area includes a computing resource or a communication resource, and is used to support a workload in the first resource area. When a workload migration condition is met, the computer system may migrate a workload in the (Continued)

first resource area to the second resource area. According to this application, workloads in the first resource area are reduced, or there is no workload in the first resource area.

20 Claims, 6 Drawing Sheets

(56) References Cited

U.S. PATENT DOCUMENTS

| | | | | |
|---|---|---|---|---|
| 8,032,891 B2* | 10/2011 | Chauvel | ................ | G06F 1/3228 |
| | | | | 718/107 |
| 11,698,673 B2* | 7/2023 | Bhattacharyya | ...... | G06F 1/3275 |
| | | | | 713/324 |
| 2001/0023488 A1* | 9/2001 | Breunig | ................ | G06F 1/305 |
| | | | | 713/300 |
| 2002/0162037 A1* | 10/2002 | Woods | ................ | G06F 1/32 |
| | | | | 713/322 |
| 2004/0215987 A1* | 10/2004 | Farkas | ................ | G06F 9/5088 |
| | | | | 713/300 |
| 2009/0164817 A1* | 6/2009 | Axford | ................ | G06F 1/3203 |
| | | | | 713/320 |
| 2010/0023788 A1* | 1/2010 | Scott | ................ | G06F 1/3209 |
| | | | | 713/320 |
| 2010/0185821 A1* | 7/2010 | Paver | ................ | G06F 12/0831 |
| | | | | 711/146 |
| 2010/0262819 A1* | 10/2010 | Yang | ................ | G06F 9/5055 |
| | | | | 712/30 |
| 2010/0299472 A1* | 11/2010 | Tanaka | ................ | G06F 9/4856 |
| | | | | 718/100 |
| 2012/0054329 A1* | 3/2012 | Gulati | ................ | H04L 43/50 |
| | | | | 709/224 |
| 2013/0318374 A1* | 11/2013 | Hum | ................ | G06F 9/5094 |
| | | | | 713/320 |
| 2014/0181825 A1* | 6/2014 | He | ................ | G06F 9/5027 |
| | | | | 718/102 |
| 2015/0019689 A1* | 1/2015 | Singh | ................ | H04L 67/06 |
| | | | | 709/219 |
| 2015/0309560 A1* | 10/2015 | Liang | ................ | G06F 1/3296 |
| | | | | 713/320 |
| 2016/0013643 A1* | 1/2016 | Park | ................ | G06F 1/28 |
| | | | | 713/300 |
| 2016/0028649 A1* | 1/2016 | Herington | ............ | H04L 47/783 |
| | | | | 709/226 |
| 2017/0142227 A1* | 5/2017 | Huang | ................ | H04L 67/1029 |
| 2018/0024609 A1* | 1/2018 | Bolt | ................ | H04L 67/104 |
| | | | | 713/323 |
| 2018/0139148 A1* | 5/2018 | Gamage | ................ | H04L 47/70 |
| 2021/0263773 A1* | 8/2021 | Shah | ................ | G06F 9/4893 |
| 2023/0027642 A1* | 1/2023 | Khanal | ................ | H04L 67/1027 |

* cited by examiner

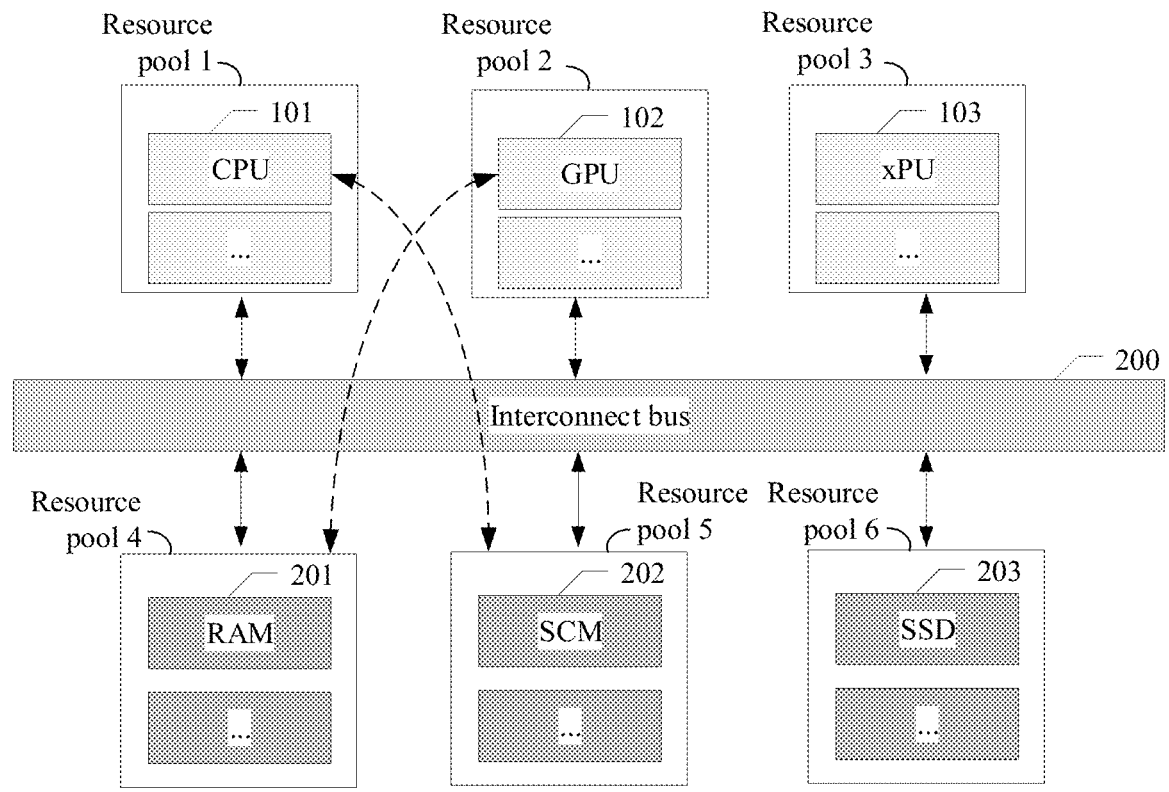

FIG. 1

When a workload migration condition is met, migrate a workload in a first resource area of a computer system to a second resource area, where a resource provided in the first resource area includes a computing resource or a communication resource, and the resource provided in the first resource area is used to support the workload in the first resource area ⟋ S201

Set a running status of a device in the first resource area to a lower-power state ⟋ S202

FIG. 2

| Configuration | XXX model |
|---|---|
| BIOS version | XX |
| BIOS settings | XXX |
| CPU | 6426×2: 240 W |
| Memory | 61.6 W |
| Main board | 78.4 W |
| RAID card | 12 W |
| Hard disk backplane | 12 W |
| Hard disk (SSD×1, HDD×11) | 115 W |
| Fan | 13 W |
| Entire system | 532 W |

FIG. 5

POWER CONSUMPTION MANAGEMENT METHOD AND APPARATUS

CROSS-REFERENCE TO RELATED APPLICATIONS

This application is a continuation of International Application No. PCT/CN2021/123128, filed on Oct. 11, 2021, which claims priorities to Chinese Patent Application No. 202011124130.8, filed on Oct. 20, 2020 and Chinese Patent Application No. 202110089298.8, filed on Jan. 22, 2021. All of the aforementioned patent applications are incorporated herein by reference in their entireties.

TECHNICAL FIELD

Embodiments of this application relate to the field of power consumption management technologies, and in particular, to a power consumption management method and apparatus, and a storage medium.

BACKGROUND

With development of computer technologies, data processing performance of a computer system is steadily improved, and power consumption is also increased. Consequently, operating expenses of the computer system are usually high during actual application. Therefore, currently a method for effectively managing power consumption of a computer system is urgently required, to reduce operating expenses of the computer system.

SUMMARY

Embodiments of this application provide a power consumption management method and apparatus, to effectively manage power consumption of a computer system, and reduce operating expenses of the computer system.

According to a first aspect, an embodiment of this application provides a power consumption management method. The method may be applied to a computer system. In addition, resources such as computing resources or communication resources in the computer system may be pre-allocated to a first resource area and a second resource area. Certainly, resources in the first resource area and the second resource area do not overlap. In addition, a resource provided in the first resource area includes a computing resource or a communication resource, and is used to support a workload in the first resource area. When a workload migration condition is met, the computer system may migrate a workload in the first resource area to the second resource area. In this case, workloads in the first resource area are reduced, or there is no workload in the first resource area. Therefore, the computer system may set a running status of a device in the first resource area to a lower-power state, for example, may set the running status of the device to a lower-power sleep state, or even to a power-off state or the like. In this way, power consumption in the first resource area can be reduced, thereby reducing overall power consumption of the computer system.

If the migrated workload includes a computing task or a communication task, although power consumption of a computing device or a communication device in the second resource area increases due to an increase in a quantity of tasks that need to be performed, a reduction in power consumption of a computing device or a communication device in the first voltage domain may approximately offset the increase in the power consumption of the computing device or the communication device in the second voltage domain. In addition, a reduction in overall power consumption of the computer system usually lies in a reduction in power consumption of another device related to the computing device or the communication device in the first resource area. For example, another auxiliary device such as a bus that supports communication with a processor may be directly turned off, to reduce power consumption. For an auxiliary device in the second resource area, even if power consumption increases due to an increase in a quantity of tasks of a computer device or a communication device, increased power consumption is far less than power consumption that can be reduced by turning off the auxiliary device in the first resource area. During actual application, additional power consumption caused during workload migration is usually far less than power consumption that can be reduced in the first resource area. Therefore, the additional power consumption can be ignored in this embodiment of this application.

In a possible implementation, the computer system may pre-divide resource areas. For example, the computer system may obtain the first resource area and the second resource area through division based on a saturation of a computing resource or a communication resource, where the saturation is used to indicate a quantity of to-be-processed tasks. A saturation of the computing resource may be, for example, a task queue length corresponding to the processor, and a saturation of the communication resource may be, for example, a task queue length corresponding to a communication element. In an example, a saturation of the computing resource or the communication resource in the first resource area may be less than a saturation of the computing resource or the communication resource in the second resource area. In this way, a plurality of different resource areas can be obtained through division in the computer system.

In a possible implementation, the computer system may alternatively obtain the first resource area and the second resource area through division based on a saturation and utilization of a computing resource or a communication resource. During actual application, the computer system may alternatively obtain a plurality of different resource areas through division in another manner.

In a possible implementation, the computer system includes a resource scheduling list. The resource scheduling list may record a resource in the second resource area, for example, may record both a computing resource and a communication resource. In this way, when a workload is added to the computer system, the computer system may invoke the resource in the scheduling list to process the new workload. In this way, the new workload may not need to be scheduled to the resource in the first resource area for processing, so that the device in the first resource area may continue to remain in the lower-power state.

In a possible implementation, the workload provided in the first resource area further includes a storage resource. In this way, for a device used to store data in the first resource area, after migrating the data stored in the device to a storage element in the second resource area, the computer system may perform processing such as power-off on the device, to further reduce power consumption in the first resource area.

In a possible implementation, the computer system may be a heterogeneous system. To be specific, the computing resource in the first resource area may include a first processor and a second processor, and a type of the first processor is different from a type of the second processor. Certainly, this is merely used as an example herein. In another possible implementation, the first resource area may include more types of processors or the like. This is not limited in this embodiment.

In a possible implementation, a user may provide a resource area configuration file for the computer system, so that the computer system may obtain the first resource area and the second resource area in the computer system through division based on the obtained resource area configuration file. In this way, the user can implement custom division of resource areas.

In a possible implementation, the computer system may present a resource area configuration interface to the user, and the user performs a corresponding configuration operation on the resource area configuration interface. For example, the user may set, on the resource area configuration interface, a quantity of resource areas and an identifier of a device such as a processor or a communication element included in each resource area. In this way, the computer system can obtain the first resource area and the second resource area in the computer system through division in response to the configuration operation performed by the user on the resource area. In this way, the user can implement custom division of resource areas.

In a possible implementation, during workload migration, the computer system may first determine a workload migration direction, for example, migration may be performed from an area with a lower load rate to an area with a higher load rate. To be specific, when determining that a load rate in the first resource area is less than a load rate in the second resource area, the computer system migrates a workload in the first resource area to the second resource area. In this way, a volume of data migrated by the computer system can be reduced.

In a possible implementation, before workload migration, the computer system may further predetermine whether a sum of a load rate in the first resource area and a load rate in the second resource area is less than a first load rate threshold. If the sum is less than the first load rate threshold, the computer system may migrate a workload in the first resource area to the second resource area, and after the workload migration, a load rate in the second resource area may not exceed an upper limit (which may be, for example, the first load rate threshold) of a load rate that can be supported in the second resource area. This can avoid an excessively high load rate in the second resource area after the computer system migrates a workload, and avoid impact on performance of the computer system.

In a possible implementation, the first resource area includes a computing resource subarea, a memory resource subarea, and an external storage resource subarea. Certainly, in another implementation, more resource subareas may alternatively be obtained through subdivision.

In a possible implementation, when the computer system sets the running status of the device in the first resource area to the lower-power state, the computer system may specifically set a running status of a device in the external storage resource subarea to a lower-power state, and then set a running status of a device in the memory resource subarea to a lower-power state, and finally set a running status of a device in the computing resource subarea to a lower-power state. In this way, power consumption of the entire first resource area is reduced by sequentially reducing power consumption in all resource subareas of the first resource area.

In a possible implementation, the resource provided in the second resource area includes a computing resource. In this case, the computer system can not only reduce power consumption in the first resource area, but also reduce a working voltage or a working frequency of a device in the second resource area, to reduce power consumption in the second resource area. In this way, power consumption of the computer system can be further reduced.

In a possible implementation, the computer system may further present a display interface to the user, and present a power consumption management result on the display interface. The power consumption management result includes any one or more of identifiers of a plurality of resource areas, power consumption of each resource area, total power consumption of the computer system, resource utilization, a device running status, a device working frequency, a device working voltage, and a device temperature. In this way, the user can conveniently and intuitively learn of a power consumption management status of the computer system.

In a possible implementation, the resource provided in the first resource area includes a storage resource. In this case, when the computer system sets the running status of the device in the first resource area to the lower-power state, the computer system may specifically set the running status of the device in the first resource area to a sleep state, or directly power off the device in the first resource area to reduce power consumption in the first resource area.

In a possible implementation, after the computer system sets the running status of the device in the first resource area to the lower-power state, when a load rate in the computer system is greater than a second load rate threshold, the computer system may further set the running status of the device in the first resource area from the sleep state to a working state, or power on the device in the first resource area. In this way, the device in the first resource area can be used to share some workloads for the second resource area, thereby improving performance of the computer system.

In a possible implementation, after setting the running status of the device in the first resource area to the lower-power state, the computer system may further add a resource to the second resource area when a load rate in the computer system is greater than a load rate threshold. For example, the second resource area may be connected to some external processors, storage elements, or communication elements, so that the second resource area can have more resources to support the workload in the second resource area.

In a possible implementation, the resource provided in the first resource area includes a computing resource. In this case, when the computer system sets the running status of the device in the first resource area to the lower-power state, the computer system may specifically reduce a working voltage or a working frequency of the device in the first resource area, to reduce power consumption in the first resource area.

According to a second aspect, based on a same inventive concept as that of the method embodiment according to the first aspect, an embodiment of this application provides a computing apparatus. The apparatus has a corresponding function for implementing each implementation of the first aspect. The function may be implemented by hardware, or may be implemented by hardware executing corresponding software. The hardware or the software includes one or more modules corresponding to the function.

According to a third aspect, an embodiment of this application provides a computing apparatus, including a processor and a memory. The memory is configured to store instructions. When the computing apparatus runs, the processor executes the instructions stored in the memory, so that the apparatus performs the power consumption management method according to any one of the first aspect or the implementations of the first aspect. It should be noted that the memory may be integrated into the processor, or may be independent of the processor. The apparatus may further include a bus. The processor is connected to the memory through the bus. The memory may include a readable memory and a random access memory.

According to a fourth aspect, an embodiment of this application further provides a readable storage medium. The readable storage medium stores a program or instructions. When the program or instructions run on a computer, the power consumption management method according to any one of the first aspect or the implementations of the first aspect is performed.

According to a fifth aspect, an embodiment of this application further provides a computer program product including instructions. When the computer program product runs on a computer, the computer is enabled to perform the power consumption management method according to any one of the first aspect or the implementations of the first aspect.

In addition, for technical effects of any one of the implementations of the second aspect to the fifth aspect, refer to technical effects of different implementations of the first aspect, or refer to technical effects of different implementations of the second aspect. Details are not described herein again.

BRIEF DESCRIPTION OF DRAWINGS

To describe technical solutions in embodiments of this application more clearly, the following briefly describes accompanying drawings required for describing embodiments. Clearly, the accompanying drawings in the following descriptions show merely some embodiments of this application, and a person of ordinary skill in the art may still derive other drawings from these accompanying drawings.

FIG. 1 is a schematic diagram of an architecture of an example computer system according to an embodiment of this application;

FIG. 2 is a schematic flowchart of a power consumption management method according to an embodiment of this application;

FIG. 5 is a schematic diagram of power consumption distribution of a server of a specific model;

DESCRIPTION OF EMBODIMENTS

Figure 3:
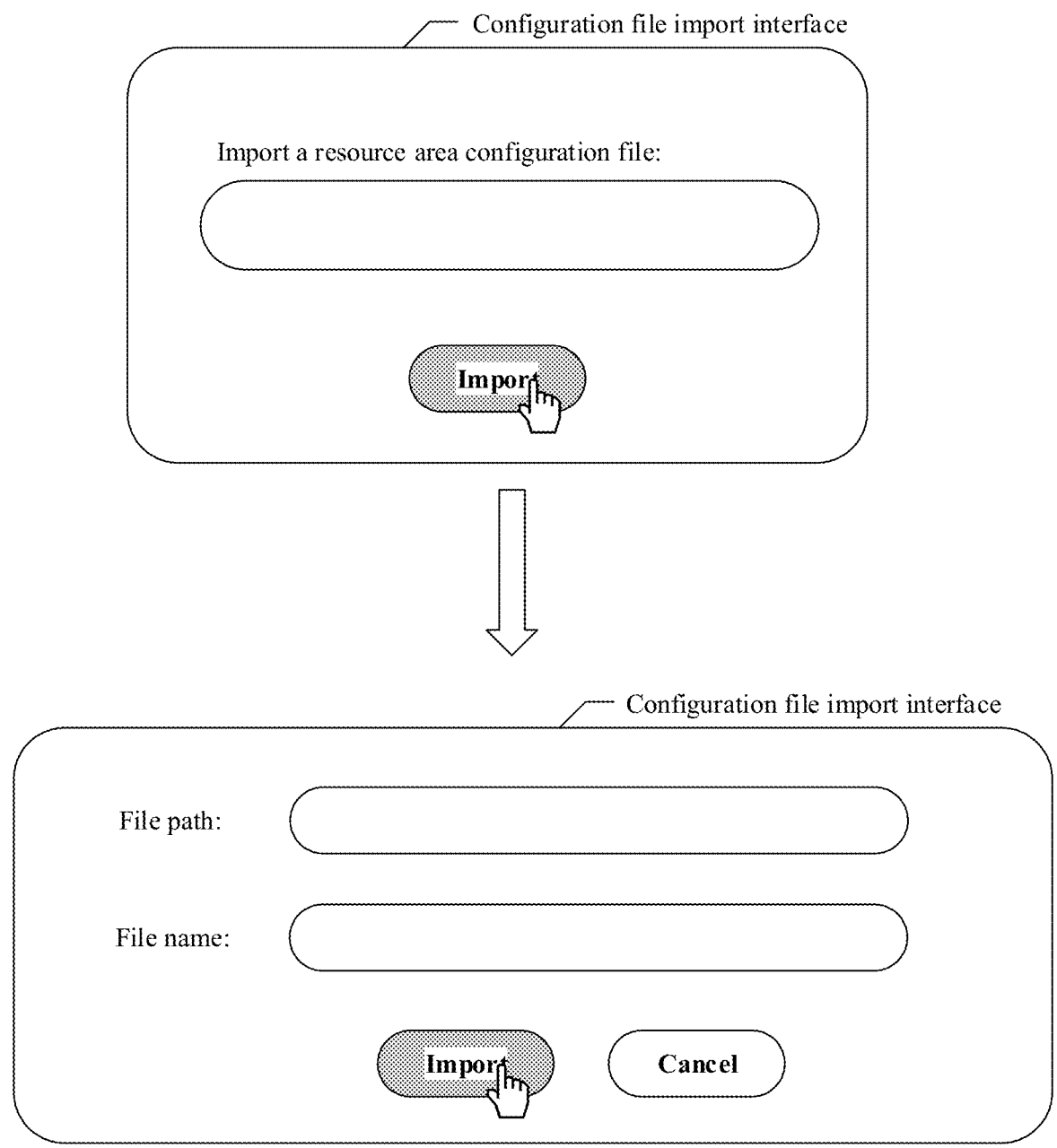
FIG. 3 is a schematic diagram of an example configuration file import interface according to an embodiment of this application.

Power consumption of a computer system is closely related to operating expenses of the computer system. Usually, higher power consumption of a computer system indicates higher operating expenses of the computer system. Therefore, how to manage power consumption of a computer system is quite important for controlling operating expenses of the computer system.

In view of this, an embodiment of this application provides a power consumption management method. During power consumption management for a computer system, a workload in a first resource area of the computer system is migrated to a second resource area of the computer system. In this way, workloads in the first resource area can be reduced, or there is even no workload in the first resource area. In this case, a running status of a device in the first resource area may be set to a lower-power state. For example, the running status of the device may be set to a lower-power sleep state, or even to a power-off state or the like. In this way, power consumption in the first resource area can be reduced, thereby reducing overall power consumption of the computer system.

It should be noted that, if the migrated workload includes a computing task or a communication task, although power consumption of a computing device (for example, a CPU) or a communication device in the second resource area increases due to an increase in a quantity of tasks that need to be performed, a reduction in power consumption of a computing device or a communication device in the first voltage domain may approximately offset the increase in the power consumption of the computing device or the communication device in the second voltage domain. In addition, a reduction in overall power consumption of the computer system usually lies in a reduction in power consumption of another device related to the computing device or the communication device in the first resource area. For example, another auxiliary device such as a bus that supports communication with the CPU may be directly turned off, to reduce power consumption. For an auxiliary device such as a bus in the second resource area, even if power consumption increases due to an increase in a quantity of tasks of a computer device or a communication device, increased power consumption is far less than power consumption that can be reduced by turning off the auxiliary device in the first resource area. During actual application, additional power consumption caused during workload migration is usually far less than power consumption that can be reduced in the first resource area. Therefore, the additional power consumption can be ignored in this embodiment of this application.

In an example, the power consumption management method for a computer system may be applied to a computer system architecture shown in FIG. 1. During actual application, the computer system may be, for example, a terminal or a server, or certainly, may be another device. Further, on the basis of including a terminal or a server, the computer system may further include another device connected to the terminal or the server, for example, an external device such as a wired keyboard or an external display.

As shown in FIG. 1, the computer system may include one or more processors such as a central processing unit (CPU) 101 and a graphics processing unit (GPU) 102 (an xPU 103 in FIG. 1 may represent any other processor). The processor is configured to be responsible for a data processing function of the computer system. Different processors may interact with each other through an interconnect bus 200. In addition, the system architecture may further include a memory element, for example, a general-purpose random access memory (RAM) 201 or a storage-class memory (SCM) 202 shown in FIG. 1; or may include an external storage element, for example, a solid state disk (SSD) 203 shown in FIG. 1. Data stored in the memory element and the external storage element in the computer system may be read and written by a processor such as the CPU 101, the GPU 102, or the xPU 103 through a communication bus.

It should be noted that the computer system shown in FIG. 1 is a heterogeneous system, and a plurality of different processors in the system may share data stored in a storage element (including a memory element and an external storage element). For example, both the CPU 101 and the GPU 102 can access data stored in the RAM 201 or the SCM 202. In another example, the power consumption management method may also be applied to a system other than a heterogeneous system. This is not limited in this embodiment.

In the computer system, two or more resource areas may be obtained through division. In an example, the CPU 101 and the RAM 201 may be allocated to a resource area 1, the GPU 102 and the SCM 202 may be allocated to a resource area 2, and the xPU 103 and the solid state disk 203 may be allocated to a resource area 3. Certainly, in another example, division may alternatively be performed in another manner. For example, the CPU 101, the SCM 202, and the RAM 201 are all allocated to the resource area 1. During power consumption management for the computer system, a workload in the resource area 2 (and the resource area 3) may be migrated to the resource area 1, and a running status of a device in the resource area 2 (and the resource area 3) is set to a low power state, or the device in the resource area 2 (and the resource area 3) is powered off, to reduce power consumption of the entire computer system.

During actual application, a same type of resource in the computer system may form a resource pool, for example, a resource pool 1 to a resource pool 6 shown in FIG. 1. The resource pool 1 may be constructed based on one or more CPUs, the resource pool 2 may be constructed based on one or more GPUs, the resource pool 4 may be constructed based on one or more RAMs, and so on. Workloads in different resource pools are separately managed and decoupled from each other, and each resource area obtained through division may include one or more resource pools.

Certainly, the computer system architecture shown in FIG. 1 is merely an example. During actual application, elements included in the computer system architecture are not limited to the example shown in FIG. 1. For example, in another possible computer system architecture, the computer system may include more or fewer elements than those in FIG. 1, and the computer system may include only one processor.

To make objectives, features, and advantages of this application clearer and more understandable, the following describes various non-restrictive implementations in embodiments of this application with reference to accompanying drawings by using examples. Clearly, the described embodiments are some but not all of embodiments of this application. All other embodiments obtained by a person of ordinary skill in the art based on embodiments of this application without creative efforts shall fall within the protection scope of this application.

FIG. 2 is a schematic flowchart of a power consumption management method according to an embodiment of this application. The method may be applied to the foregoing computer system, and the computer system may include at least two resource areas. For ease of description, an example in which the computer system includes a first resource area and a second resource area is used for description in this embodiment. During actual application, the computer system may alternatively include three or more resource areas. In addition, in this embodiment, a specific controller in the computer system or a control device connected to the computer system may perform the following power consumption management method, and the method may specifically include the following steps.

S201: When a workload migration condition is met, migrate a workload in the first resource area of the computer system to the second resource area, where a resource provided in the first resource area includes a computing resource or a communication resource, and the resource provided in the first resource area is used to support the workload in the first resource area.

The computer system includes a plurality of resource areas, and each resource area may provide a corresponding resource. In this embodiment, resources that can be provided in the first resource area and the second resource area may be any one or more of a computing resource and a communication resource. The computing resource may be specifically an element that is in the computer system and that is responsible for data computing and processing, for example, a CPU, a GPU, or a controller. The communication resource may be specifically an element that is in the computer system and that is responsible for performing data communication with another device, for example, a network interface card.

In addition, in a further possible implementation, each resource area may further include a storage resource. The storage resource may be specifically an element that is in the computer system and that is responsible for data storage, for example, a cache, a memory element, or an external storage element. Further, the storage resource may be specifically divided into a cache resource, a memory resource, and an external storage resource. Certainly, the resources described in this embodiment are merely some examples, and there may be other resources during actual application. This is not limited in this embodiment.

A resource provided in each resource area is used to support a workload in the resource area. For example, the computing resource in the first resource area may be used to support a computing task in the first resource area, and an xPU in the first resource area may process only one task at one moment. When there are a plurality of tasks running concurrently, other tasks waiting to run may be placed in a queue corresponding to the xPU for unified management and scheduling, so that the xPU sequentially processes tasks in the queue. Correspondingly, a sum of a task that is being performed by each processor in the first resource area and a task that is waiting to be performed in a corresponding queue is a workload (that is, a computing workload) in the first resource area. The xPU is used to represent any processor in the first resource area, for example, may be any processor of an accelerated processing unit (APU), a brain processing unit (BPU), a CPU, a deep-learning processing unit (DPU), a floating processing unit (FPU), a GPU, a holographic processing unit (HPU), an intelligence processing unit (IPU), a microprocessor unit (MPU), a neural-network processing unit (NPU), a radio processing unit (RPU), a tensor processing unit (TPU), a vector processing unit (VPU), and a wearable processing unit (WPU). During actual application, a computing workload in each resource area may be counted by using an xPU as a granularity.

The communication resource in the first resource area may be used to support a communication task in the first resource area. In this embodiment, a total quantity of communication tasks for which all communication elements (such as the network interface card) in the first resource area are responsible may be used as a workload (that is, a communication workload) in the first resource area.

When the first resource area further includes a storage resource, the storage resource may be used to support data storage in the first resource area. In this embodiment, a volume of data stored in all storage elements (such as a cache, a memory, and an external storage) in the first resource area may be used as a workload (that is, a storage workload) in the first resource area. In a specific implementation, data stored in the first resource area may be counted by using a channel as a granularity. A computer system based on a Linux system is used as an example. A physical memory is managed by using a page as a unit. In this case, information about total storage space and used storage space of each channel may be collected by scanning structure information of an underlying page. The used storage space may have a corresponding flag bit, so that whether the storage space is used can be determined by reading a value of the flag bit.

When the resource provided in the first resource area includes all of a computing resource, a storage resource, and a communication resource, the workload in the first resource area may include a computing workload, a storage workload, and a communication workload.

In some example implementations, the first resource area and the second resource area in the computer system may be obtained by the computer system (specifically, a controller in the computer system or a control device connected to the computer system) through division by using a corresponding configuration file. In a specific implementation, the computer system may present, for example, a configuration file import interface shown in FIG. 3 to a user, to prompt the user to import corresponding configuration information. The user clicks an import button in FIG. 3 to import a resource area configuration file in a corresponding file storage path to the computer system. In this way, the computer system can group the processor, the storage element, and the communication element (and a related element thereof) in the computer system based on the resource area configuration file, to obtain the first resource area and the second resource area.

Figure 4:
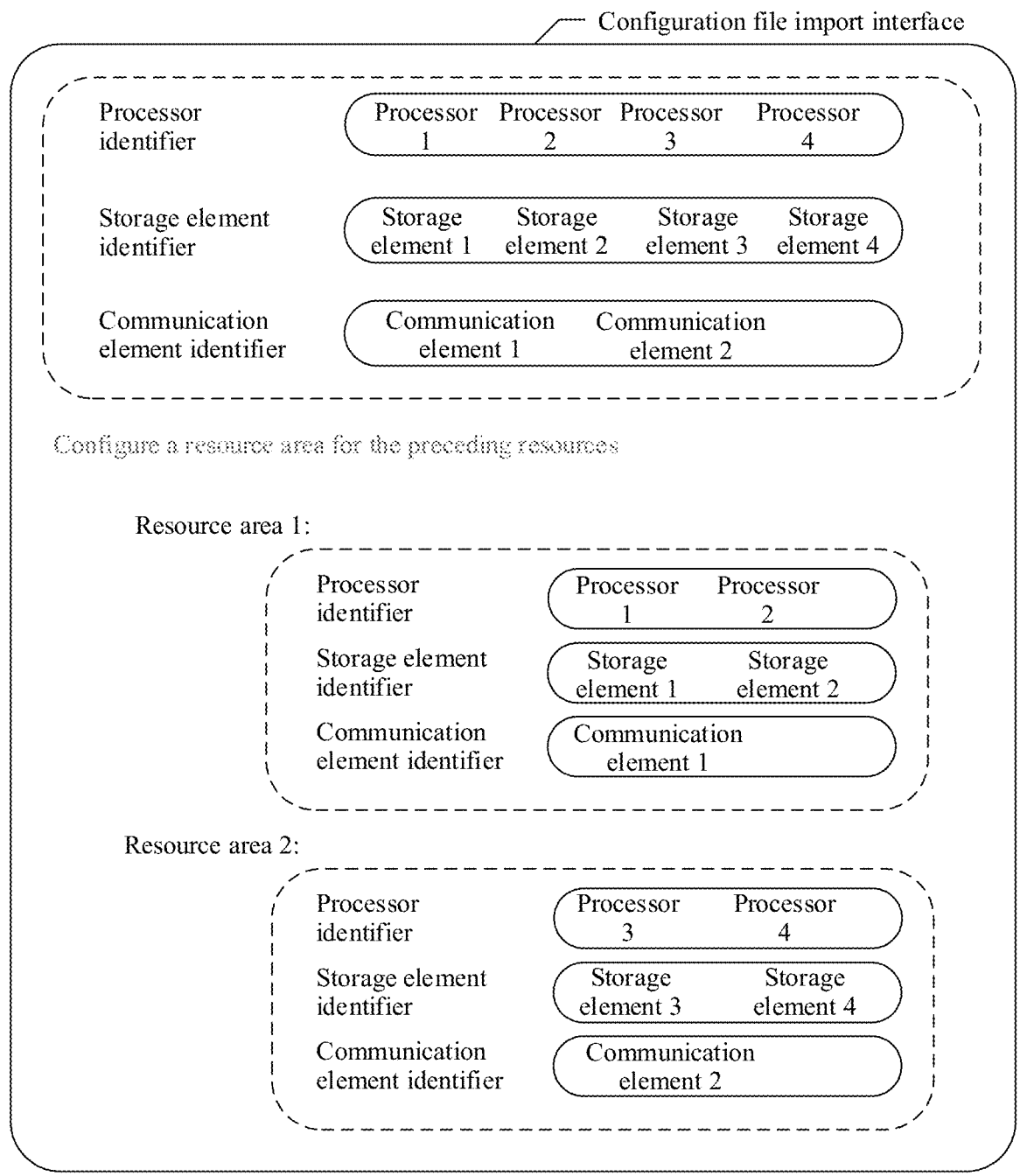
FIG. 4 is a schematic diagram of an example resource area configuration interface according to an embodiment of this application.

However, in another possible implementation, the first resource area and the second resource area in the computer system may alternatively be directly configured by a user. In a specific implementation, for example, the computer system may present a resource area configuration interface shown in FIG. 4 to a user. The resource area configuration interface may present a resource identifier in the computer system, for example, a processor identifier, a storage element identifier, and a communication element identifier shown in FIG. 4. The user may add, on the resource area configuration interface based on resource information presented on the resource area configuration interface, a resource included in each resource area. For example, in FIG. 4, the user adds identifiers of a processor 1, a processor 2, a storage element 1, a storage element 2, and a communication element 1 to the resource area 1, and adds identifiers of a processor 3, a processor 4, a storage element 3, a storage element 4, and a communication element 2 to the resource area 2. In this way, the computer system can obtain a plurality of resource areas in the computer system through division based on a configuration operation performed by the user on a resource area on the resource area configuration interface.

In still another possible implementation, the computer system may alternatively autonomously perform resource area division, or the like. For example, the computer system may allocate a processor and a communication element (and a related element thereof) in the computer system to a resource area based on a saturation of a computing resource or a communication resource in the computer system. The saturation is a quantity of tasks that are in the processor and the communication element and that are waiting to be processed, and may be determined through task statistics or by using a preset prediction algorithm. For example, a computing resource or a communication resource with a high saturation in the computer system may be allocated to the second resource area, and a computing resource or a communication resource with a low saturation may be allocated to the first resource area. The saturation is considered during resource area division. Therefore, in a period of time after the resource area division is completed, a resource in the second resource area can always satisfy a workload in the second resource area.

It should be noted that the foregoing several implementations of resource area division are merely examples for description. During actual application, resource area division may alternatively be performed in another manner. For example, the computer system may alternatively obtain a resource area through division based on utilization and a saturation of a computing resource or a communication resource. A specific implementation of resource area division is not limited in this embodiment.

During power consumption management for the computer system, a workload in the first resource area may be first migrated to the second resource area when a preset workload migration condition is met. For example, for the computing workload in the first resource area, a task in a queue corresponding to each processor in the first resource area may be specifically migrated to a queue of a processor of a same type in the second resource area. For example, assuming that a queue of a GPU 0 in the first resource area includes three to-be-performed tasks, the three tasks may be migrated to a queue of a processor GPU 1 of a same type in the second resource area. Assuming that the queue of the GPU 1 originally includes two to-be-performed tasks, after the task migration is completed, the queue of the GPU 1 includes five to-be-performed tasks, and the queue of the GPU 0 has no task.

It may be understood that, if all computing tasks in the first resource area are migrated to a queue of one processor, the queue of the processor includes a large quantity of computing tasks, and consequently, a processing delay for each computing task is large. Therefore, in some implementations, a computing task in the first resource area may be migrated to the second resource area by using a specific load balancing policy, so that a quantity of computing tasks included in a queue of each processor in the second resource area does not exceed a task quantity threshold. This can avoid impact on completion efficiency of a single computing task. For example, the load balancing policy may be as follows: A quantity of computing tasks in a queue of each processor in the second resource area is monitored during computing task migration. When a quantity of computing tasks in a queue of a processor reaches the task quantity threshold, a remaining computing task may not be further migrated to the queue of the processor. Instead, the remaining computing task is migrated to a queue of a next processor in the second resource area. In addition, when a quantity of computing tasks in the queue of the processor also reaches the task quantity threshold, a remaining computing task that has not been migrated is further migrated to a queue of another processor, and so on, until all computing tasks are migrated. In some scenarios, the load balancing policy may alternatively be evenly dividing computing tasks in the first resource area based on a quantity of processors in the second resource area, and migrating each equal part to a corresponding processor in the second resource area, or the like.

Similarly, a communication task for which each communication element in the first resource area is responsible may be migrated to a corresponding communication element in the second resource area. Data stored in each storage element in the first resource area may be migrated to a storage area of a corresponding storage element in the second resource area. In a further possible implementation, to make an upper-layer application in the computer system be unaware of data migration between different storage elements, in this embodiment, after data is migrated from the first resource area to the second resource area, a mapping relationship between a logical address (or a virtual address) and a physical address of the data may be adaptively modified. For example, before the migration, there is a mapping between a logical address A of the data and a physical address a in the first resource area. After the data migration is completed, the mapping relationship between the logical address and the physical address of the data may be modified to a mapping between the logical address A and a physical address b in the second resource area. In this way, for the upper-layer application, the logical address of the data remains unchanged. When the data needs to be read, the data can be read from the corresponding physical address b in the second resource area based on the logical address and the modified mapping relationship. In this way, the upper-layer application can be unaware of physical migration of the data.

The preset workload migration condition may be, for example, that a total load rate in the computer system is less than a first load rate threshold. The load rate threshold may be, for example, a maximum load rate that can be supported in each resource area. In this case, the total load rate in the computer system is low, and a load rate in the second resource area is still less than the load rate threshold after a workload in the first resource area is migrated to the second resource area, thereby avoiding an excessively high load rate in the second resource area after the workload migration is completed.

For another example, if there are more than two resource areas in the computer system, the workload migration condition may alternatively be that a sum of load rates of any two resource areas is less than the first load rate threshold. In this way, even if an overall load rate in the computer system is high, when a sum of load rates of two resource areas is small, workloads in the two resource areas may be aggregated into one resource area.

For still another example, the preset workload migration condition may alternatively be that a workload migration command triggered by the user is received, and the computer system may migrate the workload in the first resource area to the second resource area under the instruction by the user. Certainly, the foregoing are merely examples for describing the workload migration condition. During actual application, the workload migration condition may alternatively have another possible implementation. This is not limited in this embodiment.

In this embodiment, before a workload is migrated, a resource area from which a workload is to be migrated may be further predetermined. In an example, a resource area used in each migration may be fixedly preconfigured. For example, in each workload migration, a workload in the first resource area is migrated to the second resource area.

However, in another example, load rates in the first resource area and the second resource area may be first counted, and then values of the load rates in the two resource areas are compared. Then the first resource area with a lower load rate may be used as a resource area from which a workload needs to be migrated, and the second resource area with a higher load rate may be used as a resource area that needs to support a new workload. In this way, a volume of data to be migrated in each workload migration can be small, thereby reducing data migration costs. During actual application, if a load rate in the first resource area is greater than a load rate in the second resource area, a workload in the second resource area may alternatively be migrated to the first resource area.

Further, if the workload in the first resource area includes both a computing workload and a storage workload, during workload migration, the computing workload and the storage workload may be correspondingly migrated to the second resource area. In this way, when performing a migrated computing task, a processor in the second resource area may directly read data from a storage location corresponding to the computing task, thereby facilitating data searches.

During actual application, a resource area from which a workload is to be migrated each time and a resource area to which the workload is to be migrated may alternatively be determined in another manner. This is not limited in this embodiment.

After a workload in the first resource area is migrated to the second resource area, workloads in the first resource area can be reduced, or there is no workload in the first resource area. In this case, step S202 may be further performed to reduce power consumption of the computer system.

S202: Set a running status of a device in the first resource area to a lower-power state.

For example, when all workloads in the first resource area are migrated to the second resource area, a load rate in the first resource area is 0. In this case, the device in the first resource area may not need to continue to run. Therefore, in some implementations, in the case of reducing power consumption of a device in the first resource area, a storage element (namely, a storage resource) and a communication element (namely, a communication resource) used for data storage in the first resource area may be set to a sleep state, or the storage element or the communication element may be directly powered off. For a processor (namely, a computing resource) used for data processing in the first resource area, a working voltage or a working frequency of the processor may be reduced, so that the processor enters a low-power or lowest-power state, for example, a sleep state. During actual application, if the processor in the first resource area is hot-swapped, in the case of reducing power consumption in the first resource area, the processor in the first resource area may alternatively be powered off, so that power consumption in the first resource area is minimized.

However, if some workloads are still reserved in the first resource area, the processor in the first resource area may no longer need to remain in a high-power running state. For a processor used for data processing in the first resource area, a working voltage or a working frequency of the processor may be reduced, so that the processor enters a running low power state. In this way, the processor running in the first resource area can run with low power consumption while supporting the reserved workloads, so that power consumption in the first resource area remains at a low level.

In this embodiment, in the case of reducing power consumption of devices in the first resource area, power consumption of the devices in the first resource area may be sequentially reduced in a specific sequence. Specifically, assuming that the resource in the first resource area includes a computing resource and a storage resource (including a memory element and an external storage element), and the devices in the first resource area may constitute a computing resource subarea, a memory resource subarea, and an external storage resource subarea. The computing resource subarea includes at least one or more processors, the memory resource subarea includes at least one or more memory elements, and the external storage resource subarea may include one or more external storage elements. In this case, in the case of reducing power consumption of the devices in the first resource area, power consumption of a device in the external storage resource subarea may be first reduced, for example, the external storage element in the external storage resource subarea is powered off; then power consumption of a device in the memory resource subarea is reduced, for example, the memory element in the memory resource subarea is powered off; and finally, power consumption of a device in the computing resource subarea is reduced, for example, a voltage or a frequency of the processor in the computing resource subarea is reduced. Certainly, in some actual application scenarios, a sequence of reducing power consumption of devices in the computing resource subarea, the memory resource subarea, and the external storage resource subarea may alternatively be set randomly. For example, power consumption of a device in the computing resource subarea may be first reduced, and then power consumption of devices in the memory resource subarea and the external storage resource subarea is reduced. This is not limited in this embodiment.

In some actual application scenarios, after a workload in the first resource area is migrated to the second resource area, power consumption in the second resource area may be further reduced. For example, when an upper-layer application has a low requirement for data processing performance (for example, computing efficiency) of the computer system, a working voltage or a working frequency of a processor (namely, a computing resource) in the second resource area may be reduced, so that power consumption in the second resource area can be reduced to some extent, and power consumption reduction effects for the computer system can be further improved.

In this way, overall power consumption of the computer system can be effectively reduced by reducing power consumption of devices in the first resource area (and power consumption of devices in the second resource area), so that operating expenses of the computer system can be reduced. Specifically, if the migrated workload includes stored data, a storage device in the first resource area may be in a low power consumption or power-off state, and storage power consumption of a storage device in the second resource area usually does not increase with an increase in a volume of stored data. If the migrated workload includes a computing task or a communication task, although power consumption of a computing device (for example, a CPU) or a communication device in the second resource area increases due to an increase in a quantity of tasks that need to be performed, a reduction in power consumption of a computing device or a communication device in the first voltage domain may approximately offset the increase in the power consumption of the computing device or the communication device in the second voltage domain. In addition, a reduction in overall power consumption of a device usually lies in a reduction in power consumption of another device related to the computing device or the communication device in the first resource area. For example, another auxiliary device such as a bus that supports communication with the CPU may be directly turned off, to reduce power consumption. For an auxiliary device such as a bus in the second resource area, power consumption usually does not increase with an increase in a quantity of tasks of a computing device or a communication device; or even if power consumption increases, increased power consumption is far less than power consumption that can be reduced by turning off the auxiliary device in the first resource area.

For example, total power consumption of a server of a specific model shown in FIG. 5 is 532 W, and specific power consumption distribution of the server is shown in FIG. 5. Total power consumption of a CPU, a memory, and a hard disk is 415 W, accounting for approximately 80% of the total power consumption. It is assumed that, in a comprehensive light-load scenario, a CPU load rate is 50% (which may be measured by using CPU utilization), a memory load rate is 50%, and a disk load rate is 50%. In this case, after a first resource area and a second resource area are obtained through resource area division on the server, a ratio of a resource included in the first resource area to a resource included in the second resource area may be 1:1. In this case, workloads of all CPUs, memories, and hard disks in the first resource area may be migrated to the second resource area. Theoretically, 50% of CPU resources, 50% of memory resources, and 50% of disk resources in the first resource area of the server may all be in an idle state, and therefore may all be powered off to reduce system power consumption; and remaining 50% of CPU resources, 50% of memory resources, and 50% of disk resources in the second resource area on the server may support a current workload of the server. Based on power consumption distribution of CPU, memory, and hard disk resources of a single server shown in FIG. 5, overall power consumption that can be reduced for a single server is approximately 200 W, accounting for 30% of the total power consumption. In addition, if a CPU in the second resource area is further managed through dynamic voltage adjustment or frequency adjustment, effects of further reducing power consumption of the entire system can be achieved by reducing power consumption in the second resource area.

After power consumption in the first resource area is reduced, a resource in the first resource area may be removed from a resource scheduling list. In this case, a resource recorded in the resource scheduling list is a resource in the second resource area. In this way, when a workload is added to the computer system, for example, a computing task or a communication task is added, the computer system may schedule the resource in the second resource area from the resource scheduling list to process the new workload, thereby avoiding re-scheduling the new workload to the first resource area. In an example, a task scheduling domain may be maintained in the computer system. The task scheduling domain may include identifiers of a plurality of processors for processing computing tasks, and a computing task in the computer system is allocated to any processor in the task scheduling domain. After power consumption in the first resource area is reduced, to prevent power consumption in the first resource area from increasing because a computing task is reallocated to the first resource area, in this embodiment, an identifier of a processor in the first resource area may be removed from the task scheduling domain, so that a new computing task in the computer system may not be scheduled to the processor in the first resource area for execution. Similarly, the computer system may further maintain a storage scheduling domain, where the storage scheduling domain may include identifiers of a plurality of storage elements used for data storage, and data in the computer system is allocated to any storage element in the storage scheduling domain for storage. After power consumption in the first resource area is reduced, to prevent power consumption in the first resource area from increasing because to-be-stored data is reallocated to the first resource area, in this embodiment, an identifier of a storage element in the first resource area may be removed from the storage scheduling domain, so that new to-be-stored data may not be scheduled to the storage element in the first resource area for storage.

Figure 6:
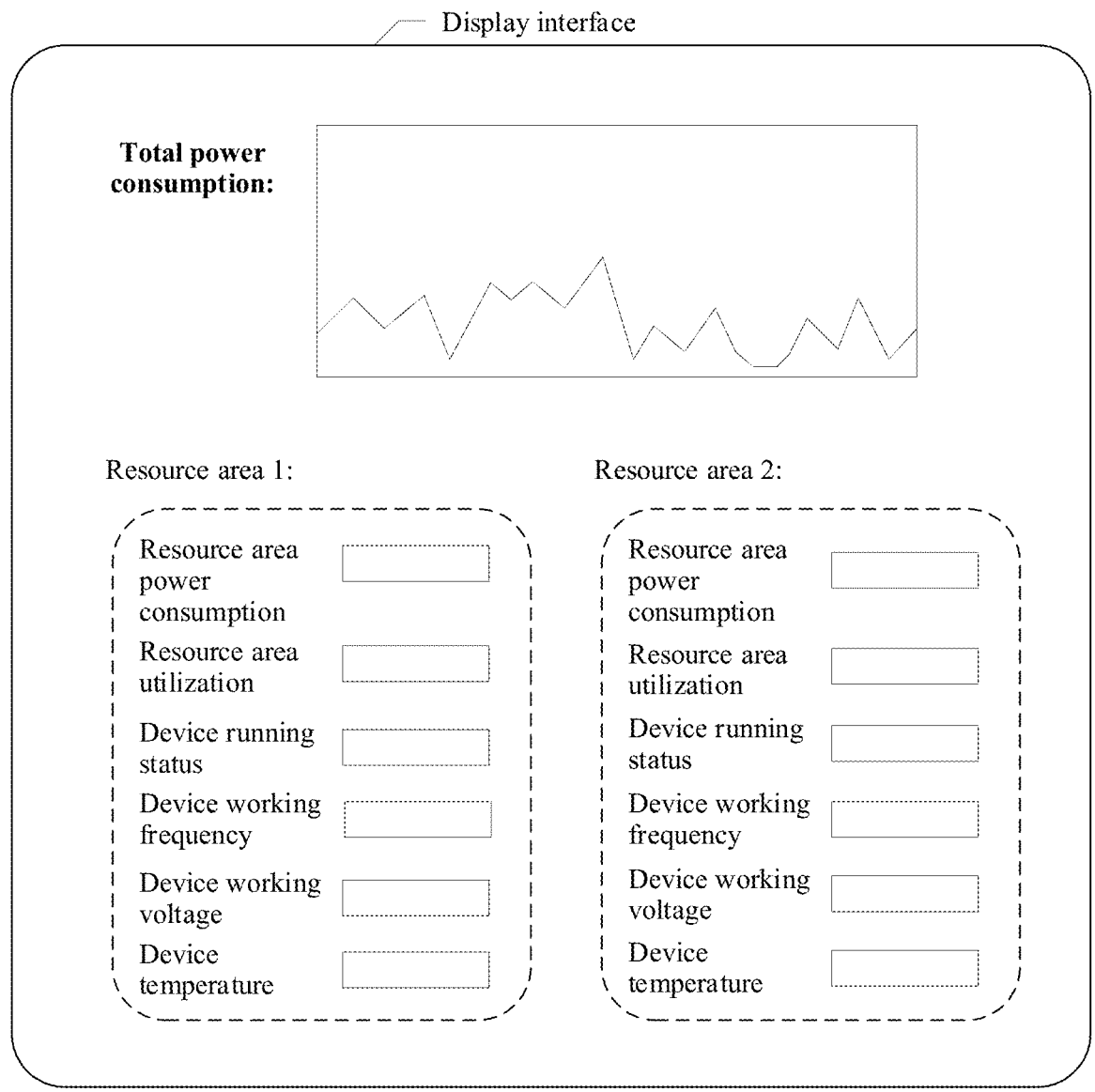
FIG. 6 is a schematic diagram of an example display interface according to an embodiment of this application.

In this embodiment, the computer system may further present a power consumption management result of the computer system to the user. In an example, the computer system may present a display interface shown in FIG. 6 to the user. The display interface may present a power consumption management result of the computer system. As shown in FIG. 6, the power consumption management result may include information such as identifiers of a plurality of resource areas (for example, a resource area 1 and a resource area 2 in FIG. 6), power consumption of each resource area, resource utilization, a device running status, a device working frequency, a device working voltage, a device temperature, and total power consumption of the computer system. Further, FIG. 6 may further present a curve indicating a change of total power consumption of the computer system in a period of time, so that the user can learn of a change status of power consumption of the computer system in the period of time. Certainly, during actual application, the presented power consumption management result may alternatively be some of the information in the foregoing example, or include more other information, or the like. This is not limited in this embodiment.

During actual application, a load rate in the computer system may also increase. For example, a quantity of tasks that need to be processed by the computer system increases, where the tasks include any one or more of a computing task, a storage task, and a communication task, or the like. Therefore, in a further possible implementation, when the load rate in the computer system increases, specifically, when the load rate in the computer system is greater than a second load rate threshold, if a running status of a device in the first resource area is previously set to a sleep state, the running status of the device may be set to a working state; or if the device in the first resource area is previously powered off, the device may be powered on again. In this way, after the device in the first resource area recovers to the working state, the device in the first resource area may support a new workload in the computer system, thereby avoiding an excessively high load rate in the second resource area because all workloads in the computer system are supported by the second resource area.

In another possible implementation, when the load rate in the computer system increases and is greater than the second load rate threshold, a new resource may alternatively be added to the second resource area to support a new workload in the second resource area. In this case, the device in the first resource area may still remain in a low power or power-off state. For example, when a computing workload in the second resource area is high, a processor may be added to the second resource area and powered on, so that the new processor is used to support a new task in the second resource area. When a storage workload in the second resource area is high, a storage element may be added to the second resource area and powered on, so that the new storage element is used to support new to-be-stored data in the second resource area. When a communication workload in the second resource area is high, a communication element may be added to the second resource area, so that the new communication element is used to support a new communication task in the second resource area.

Alternatively, in still some possible implementations, when the load rate in the computer system increases and is greater than the second load rate threshold, resources in the first resource area and the second resource area may be adjusted, and specifically, a resource in the second resource area may be migrated to the second resource area. For example, when a computing load rate in the second resource area is high, a processor in a low power state in the first resource area may be recovered to a normal working state, or a processor in a power-off state in the first resource area is powered on again, so that the processor that is recovered to the normal working state or the processor that is powered on again can support a new task in the second resource area. In this case, the processor may also be migrated from the first resource area to the second resource area. Similarly, when a storage load rate in the second resource area is high, some or all of storage elements in the first resource area may be recovered to a normal working state or powered on again, and are used to store new to-be-stored data in the second resource area. When a communication load rate in the second resource area is high, some or all of communication elements in the first resource area may be recovered to a normal working state or powered on again, and are used to support a new communication task in the second resource area.

It should be noted that, in this embodiment, an example in which the computer system includes the first resource area and the second resource area is used to describe a power consumption management process of the computer system. During actual application, the computer system may alternatively include three or more resource areas. In addition, for a power consumption management manner of the computer system, refer to the power consumption management process described in the foregoing embodiments. Details are not described herein again.

The power consumption management method provided in this application is described in detail above with reference to FIG. 1 to FIG. 6. A computing apparatus provided in this application is described below with reference to FIG. 7 and FIG. 8.

Figure 7:
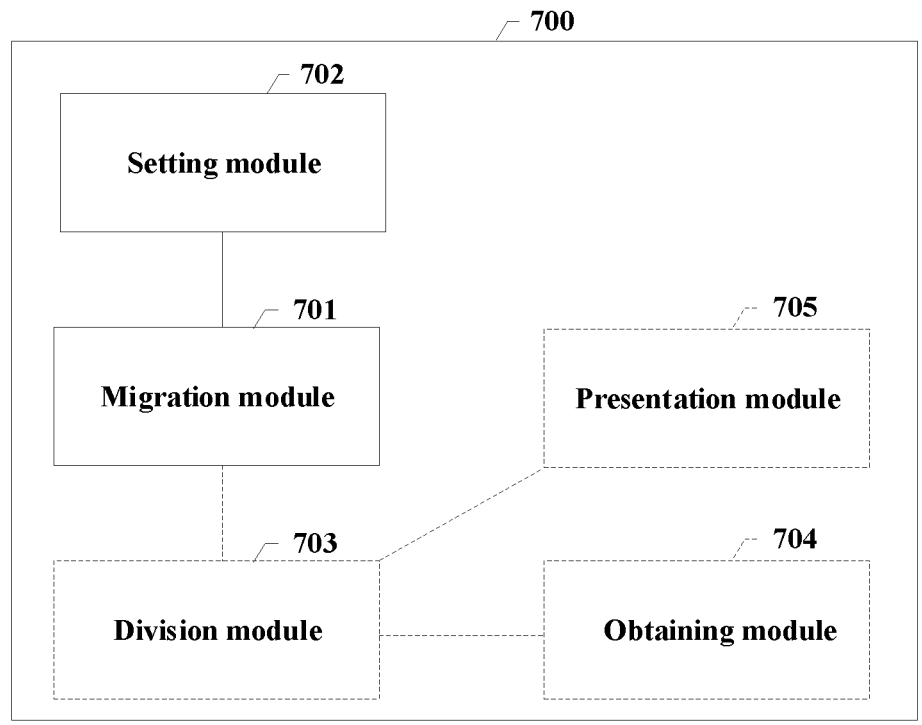
FIG. 7 is a schematic diagram of a structure of a computing apparatus according to an embodiment of this application.

Based on a same inventive concept as that of the foregoing method, an embodiment of this application further provides a computing apparatus. The apparatus can implement the power consumption management process in the embodiment shown in FIG. 2. As shown in FIG. 7, the apparatus may be used in a computer system, and the computer system includes a first resource area and a second resource area. The apparatus 700 may include:

a migration module 701, configured to: when a workload migration condition is met, migrate a workload in the first resource area to the second resource area, where a resource provided in the first resource area includes a computing resource or a communication resource, and the resource provided in the first resource area is used to support the workload in the first resource area; and a setting module 702, configured to set a running status of a device in the first resource area to a lower-power state.

In a possible implementation, the apparatus 700 further includes:

a division module 703, configured to obtain the first resource area and the second resource area through division based on a saturation of a computing resource or a communication resource in the computer system, where the saturation is used to indicate a quantity of to-be-processed tasks.

In a possible implementation, the computer system includes a resource scheduling list, and the resource scheduling list is used to record a resource in the second resource area; and the setting module 702 is further configured to: when a workload is added to the computer system, invoke the resource in the resource scheduling list to process the new workload.

In a possible implementation, the resource provided in the first resource area further includes a storage resource.

In a possible implementation, the computing resource in the first resource area includes a first processor and a second processor, and a type of the first processor is different from a type of the second processor.

In a possible implementation, the apparatus 700 further includes:

an obtaining module 704, configured to obtain a resource area configuration file, where the division module 703 is configured to obtain the first resource area and the second resource area in the computer system through division based on the resource area configuration file.

In a possible implementation, the apparatus further includes:

a presentation module 705, configured to present a resource area configuration interface, where the division module 703 is configured to: in response to a configuration operation performed by a user on a resource area on the resource area configuration interface, obtain the first resource area and the second resource area in the computer system through division.

In a possible implementation, a load rate in the first resource area is less than a load rate in the second resource area.

In a possible implementation, the workload migration condition includes that a sum of the load rate in the first resource area and the load rate in the second resource area is less than a first load rate threshold.

In a possible implementation, the first resource area includes a computing resource subarea, a memory resource subarea, and an external storage resource subarea.

In a possible implementation, the setting module 702 is specifically configured to:

after setting a running status of a device in the external storage resource subarea to a lower-power state, set a running status of a device in the memory resource subarea to a lower-power state; and after setting the running status of the device in the memory resource subarea to the lower-power state, set a running status of a device in the computing resource subarea to a lower-power state.

In a possible implementation, the resource provided in the first resource area includes a storage resource, and the setting module 702 is specifically configured to:

set the running status of the device in the first resource area to a sleep state; or power off the device in the first resource area.

In a possible implementation, after setting the running status of the device in the first resource area to the lower-power state, the setting module 702 is further configured to:

when a load rate in the computer system is greater than a second load rate threshold, set the running status of the device in the first resource area from the sleep state to a working state; or when a load rate in the computer system is greater than a second load rate threshold, power on the device in the first resource area.

In a possible implementation, after setting the running status of the device in the first resource area to the lower-power state, the setting module is further configured to:

when a load rate in the computer system is greater than a load rate threshold, add a resource to the second resource area.

In a possible implementation, the resource provided in the first resource area includes a computing resource, and the setting module 702 is specifically configured to reduce a working voltage or a working frequency of the device in the first resource area.

In a possible implementation, the resource provided in the second resource area includes a computing resource; and the setting module 702 is further configured to reduce a working voltage or a working frequency of a device in the second resource area.

In a possible implementation, the presentation module 705 is configured to present a power consumption management result on a display interface, where the power consumption management result includes any one or more of identifiers of a plurality of resource areas, power consumption of each resource area, total power consumption of the computer system, resource utilization, a device running status, a device working frequency, a device working voltage, and a device temperature.

The computing apparatus 700 in this embodiment corresponds to the power consumption management method shown in FIG. 2. Therefore, for specific implementations of the functional modules in the computing apparatus 700 in this embodiment and technical effects thereof, refer to related descriptions in the embodiment shown in FIG. 2. Details are not described herein again.

Figure 8:
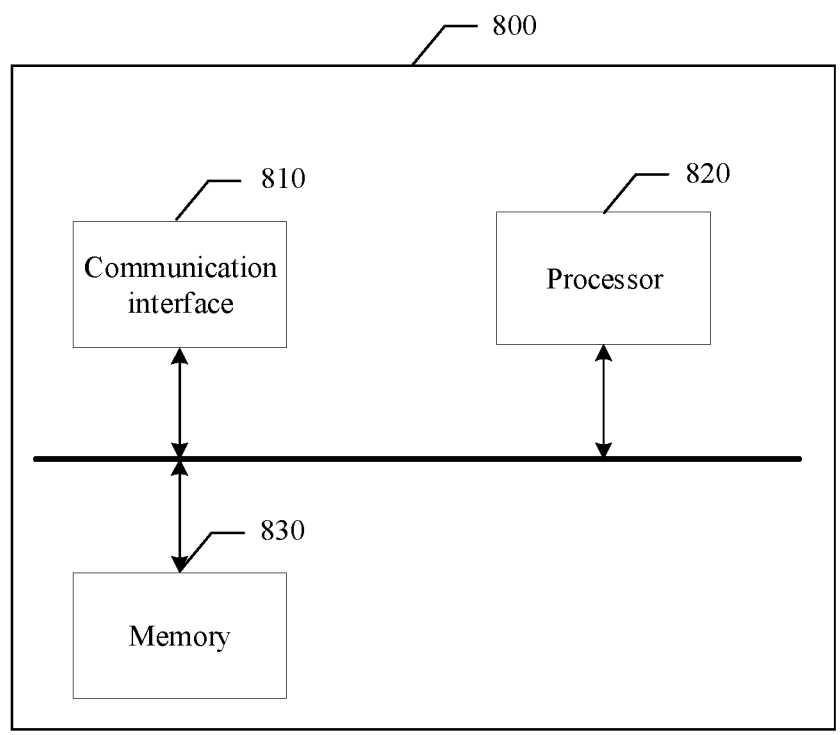
FIG. 8 is a schematic diagram of a hardware structure of a computing apparatus according to an embodiment of this application.

In addition, an embodiment of this application further provides a computing apparatus. As shown in FIG. 8, the apparatus 800 may include a communication interface 810 and a processor 820. Optionally, the apparatus 800 may further include a memory 830. The memory 830 may be disposed in the apparatus 800, or may be disposed outside the apparatus 800. For example, all actions in the embodiment shown in FIG. 2 may be implemented by the processor 820. The processor 820 may be configured to implement any method performed in FIG. 2. During implementation, steps in a processing process may be implemented by an integrated logic circuit of hardware in the processor 820 or by instructions in a form of software, to perform the method performed in FIG. 2. For brevity, details are not described herein again. Program code executed by the processor 820 for implementing the foregoing method may be stored in the memory 830. The memory 830 is connected to, for example, coupled to, the processor 820.

Some features of this embodiment of this application may be implemented or supported by the processor 820 by executing program instructions or software code in the memory 830. Software components loaded in the memory 830 may be summarized in terms of functions or logic, for example, the migration module 701, the setting module 702, the division module 703, and the presentation module 705 shown in FIG. 7. A function of the obtaining module 704 may be implemented by the communication interface 810.

Any communication interface in embodiments of this application may be a circuit, a bus, a transceiver, or another apparatus that can be used for information exchange, for example, the communication interface 810 in the apparatus 800. For example, the another apparatus may be a device connected to the apparatus 800, for example, may be a display terminal that interacts with a user.

In embodiments of this application, the processor may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

Couplings in embodiments of this application are indirect couplings or communication connections between apparatuses, units, or modules, may be in an electrical, mechanical, or another form, and are used for information exchange between the apparatuses, the units, and the modules.

The processor and the memory may operate cooperatively. The memory may be a nonvolatile memory, for example, a hard disk drive (HDD) or a solid-state drive (SSD), or may be a volatile memory, for example, a random access memory (RAM). The memory is any other medium that can be used to carry or store expected program code in a form of an instruction or a data structure and that can be accessed by a computer, but is not limited thereto.

A specific connection medium between the communication interface, the processor, and the memory is not limited in embodiments of this application. For example, the memory, the processor, and the communication interface may be connected through a bus. The bus may be categorized as an address bus, a data bus, a control bus, or the like.

Based on the foregoing embodiments, an embodiment of this application further provides a computer storage medium. The storage medium stores a software program. When the software program is read and executed by one or more processors, the method provided in any one or more of the foregoing embodiments may be implemented. The computer storage medium may include any medium that can store program code, for example, a USB flash drive, a removable hard disk, a read-only memory, a random access memory, a magnetic disk, or an optical disc.

Based on the foregoing embodiments, an embodiment of this application further provides a chip. The chip includes a processor, configured to implement the functions of the computer system in the foregoing embodiments. Optionally, the chip further includes a memory, and the memory is configured to store necessary program instructions and data that are to be executed by the processor. The chip may include a chip, or may include a chip and another discrete device.

A person skilled in the art should understand that embodiments of this application may be provided as a method, a system, or a computer program product. Therefore, this application may be implemented in a form of hardware only embodiments, software only embodiments, or embodiments with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to operate in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

In the specification, claims, and accompanying drawings of this application, the terms "first", "second", and the like are intended to distinguish between similar objects but do not necessarily indicate a specific order or sequence. It should be understood that the terms used in this way are interchangeable in appropriate circumstances and are merely intended for distinguishing when objects having a same attribute are described in embodiments of this application.

Clearly, a person skilled in the art can make various modifications and variations to embodiments of this application without departing from the scope of embodiments of this application. This application is intended to cover these modifications and variations to embodiments of this application provided that they fall within the scope of the claims of this application and their equivalent technologies.

What is claimed is:

1. A power consumption management method, wherein the method is applied to a computer system, the computer system comprises a first resource area and a second resource area, and the method comprises:

migrating, based on a workload migration condition being met, a workload in the first resource area to the second resource area, wherein a resource provided in the first resource area comprises a computing resource or a communication resource, and the resource provided in the first resource area is used to support the workload in the first resource area;

setting a running status of a device in the first resource area to a lower-power state;

obtaining the first resource area and the second resource area through division based on a saturation of a computing resource or a communication resource in the computer system, wherein the saturation indicates a quantity of to-be-processed tasks; and wherein a saturation of the computing resource or the communication resource in the first resource area is less than a saturation of the computing resource or the communication resource in the second resource area.

2. The method according to claim 1, wherein the computer system comprises a resource scheduling list, the resource scheduling list is used to record a resource in the second resource area, and the method further comprises:
invoking, based on a new workload being added to the computer system, the resource in the resource scheduling list to process the new workload.

3. The method according to claim 1, wherein the resource provided in the first resource area further comprises a storage resource.

4. The method according to claim 1, wherein the computing resource in the first resource area comprises a first processor and a second processor, and a type of the first processor is different from a type of the second processor.

5. The method according to claim 1, further comprising:
obtaining a resource area configuration file; and
obtaining the first resource area and the second resource area in the computer system through division based on the resource area configuration file.

6. The method according to claim 1, further comprising:
presenting a resource area configuration interface; and
in response to a configuration operation performed by a user on a resource area on the resource area configuration interface, obtaining the first resource area and the second resource area in the computer system through division.

7. A computing apparatus, wherein the apparatus comprises a memory and a processor, the memory is configured to store instructions, which upon execution by the processor cause the apparatus to perform the following operations:
migrating, based on a workload migration condition being met, a workload in the first resource area to the second resource area, wherein a resource provided in the first resource area comprises a computing resource or a communication resource, and the resource provided in the first resource area is used to support the workload in the first resource area;
setting a running status of a device in the first resource area to a lower-power state;
obtaining the first resource area and the second resource area through division based on a saturation of a computing resource or a communication resource in the computer system, wherein the saturation indicates a quantity of to-be-processed tasks; and
wherein a saturation of the computing resource or the communication resource in the first resource area is less than a saturation of the computing resource or the communication resource in the second resource area.

8. The method according to claim 1, further comprising: presenting a display interface to a user, and presenting a power consumption management result on the display interface.

9. The computing apparatus of claim 7, wherein the computer system comprises a resource scheduling list, the resource scheduling list is used to record a resource in the second resource area, and the operations further include:
invoking, based on a new workload being added to the computer system, the resource in the resource scheduling list to process the new workload.

10. The computing apparatus of claim 7, wherein the resource provided in the first resource area further comprises a storage resource.

11. The computing apparatus of claim 7, wherein the computing resource in the first resource area comprises a first processor and a second processor, and a type of the first processor is different from a type of the second processor.

12. The computing apparatus of claim 7, wherein the operations further include:
obtaining a resource area configuration file; and
obtaining the first resource area and the second resource area in the computer system through division based on the resource area configuration file.

13. The computing apparatus of claim 7, wherein the operations further include:
presenting a resource area configuration interface; and
in response to a configuration operation performed by a user on a resource area on the resource area configuration interface, obtaining the first resource area and the second resource area in the computer system through division.

14. A non-transitory computer-readable storage medium comprising instructions which upon execution by a computer cause the computer to perform the following operations:
migrating, based on a workload migration condition being met, a workload in the first resource area to the second resource area, wherein a resource provided in the first resource area comprises a computing resource or a communication resource, and the resource provided in the first resource area is used to support the workload in the first resource area;
setting a running status of a device in the first resource area to a lower-power state;
obtaining the first resource area and the second resource area through division based on a saturation of a computing resource or a communication resource in the computer system, wherein the saturation indicates a quantity of to-be-processed tasks; and
wherein a saturation of the computing resource or the communication resource in the first resource area is less than a saturation of the computing resource or the communication resource in the second resource area.

15. The computing apparatus of claim 7, wherein the operations further include: presenting a display interface to a user, and presenting a power consumption management result on the display interface.

16. The non-transitory computer-readable storage medium of claim 14, wherein the computer system comprises a resource scheduling list, the resource scheduling list is used to record a resource in the second resource area, and the operations further include:
invoking, based on a new workload being added to the computer system, the resource in the resource scheduling list to process the new workload.

17. The non-transitory computer-readable storage medium of claim 14, wherein the resource provided in the first resource area further comprises a storage resource, and the computing resource in the first resource area comprises a first processor and a second processor, and a type of the first processor is different from a type of the second processor.

18. The non-transitory computer-readable storage medium of claim 14, wherein the operations further include:
obtaining a resource area configuration file; and
obtaining the first resource area and the second resource area in the computer system through division based on the resource area configuration file.

19. The non-transitory computer-readable storage medium of claim 14, wherein the operations further include:
 presenting a resource area configuration interface; and
 in response to a configuration operation performed by a user on a resource area on the resource area configuration interface, obtaining the first resource area and the second resource area in the computer system through division.

20. The non-transitory computer-readable storage medium of claim 14, wherein the operations further include: presenting a display interface to a user, and presenting a power consumption management result on the display interface.

* * * * *